United States Patent
Li et al.

(10) Patent No.: US 10,622,804 B2
(45) Date of Patent: Apr. 14, 2020

(54) METHOD FOR PREVENTING DIFFERENTIAL PROTECTION MALOPERATION OF OPTICAL FIBER CAUSED BY SATURATION OF SINGLE CT OF 3/2 CONNECTION

(71) Applicants: XJ GROUP CORPORATION, Xuchang, Henan (CN); XJ ELECTRIC CO., LTD, Xuchang, Henan (CN); Xuchang XJ Software Technology Co., Ltd, Xuchang, Henan (CN); State Grid Corporation of China, Beijing (CN)

(72) Inventors: Baowei Li, Xuchang (CN); Chuankun Ni, Xuchang (CN); Wenzheng Li, Xuchang (CN); Xu Li, Xuchang (CN); Ziqiang Jiang, Xuchang (CN); Yanmei Tang, Xuchang (CN); Huizhen Hao, Xuchang (CN); Xin Shi, Xuchang (CN); Jiansong Zhao, Xuchang (CN); Xintao Dong, Xuchang (CN); Yingying Xi, Xuchang (CN); Quanxia Ma, Xuchang (CN); Yantao Qiao, Xuchang (CN); Yu Tang, Xuchang (CN); Liping Meng, Xuchang (CN)

(73) Assignees: XJ GROUP CORPORATION, Xuchang, Henan (CN); XJ ELECTRIC CO., LTD., Xuchang, Henan (CN); XUCHANG XJ SOFTWARE TECHNOLOGY CO., LTD., Xuchang, Henan (CN); STATE GRID CORPORATION OF CHINA, Beijing (CN)

(*) Notice: Subject to any disclaimer, the term of this patent is extended or adjusted under 35 U.S.C. 154(b) by 518 days.

(21) Appl. No.: 15/352,349

(22) Filed: Nov. 15, 2016

(65) Prior Publication Data
US 2017/0163024 A1    Jun. 8, 2017

(30) Foreign Application Priority Data

Dec. 7, 2015    (CN) .......................... 2015 1 0890068

(51) Int. Cl.
*H02H 3/00*    (2006.01)
*H02H 3/28*    (2006.01)

(52) U.S. Cl.
CPC .................................. *H02H 3/283* (2013.01)

(58) Field of Classification Search
CPC ....................................................... H02H 3/283
(Continued)

(56) References Cited

U.S. PATENT DOCUMENTS

| 6,434,285 B1* | 8/2002 | Blake ..................... G01R 31/02 |
| | | 250/225 |
| 6,442,010 B1* | 8/2002 | Kasztenny ............. H02H 3/283 |
| | | 361/63 |

(Continued)

FOREIGN PATENT DOCUMENTS

| CN | 101237143 A | 8/2008 |
| CN | 104682360 A | 6/2015 |

OTHER PUBLICATIONS

Notification of the First Office Action of Chinese application No. 201510890068.6, dated Jul. 24, 2017.
(Continued)

*Primary Examiner* — Thienvu V Tran
*Assistant Examiner* — Lucy M Thomas
(74) *Attorney, Agent, or Firm* — Syncoda LLC; Feng Ma

(57) ABSTRACT

The present disclosure relates to a method for preventing a maloperation of differential protection of an optical fiber caused by saturation of a single Current Transformer (CT) of 3/2 connection. By applying a combination of the differential judgment and the sub-CT current judgment, reliable identification of internal and external faults is ensured, and
(Continued)

the problem of misjudging of the internal fault as the external fault can be prevented as well.

5 Claims, 2 Drawing Sheets

(58) Field of Classification Search
USPC .......................................................... 361/63
See application file for complete search history.

(56) References Cited

U.S. PATENT DOCUMENTS

2003/0030953 A1    2/2003  Sunberg
2008/0036559 A1*  2/2008  Gajic .................... H02H 1/046
                                                                         335/7

OTHER PUBLICATIONS

Jidong et al., "Re tripping discrimination of bus differential protection when external fault transforms to Internal fault", Automation of Electric Power Systems, vol. 38, No. 18, 2014.
Zhen-feng et al., "Discussing some special problems about application of teed line differential protection", Power System Protection and Control, vol. 37, No. 17, 2009.

* cited by examiner

METHOD FOR PREVENTING DIFFERENTIAL PROTECTION MALOPERATION OF OPTICAL FIBER CAUSED BY SATURATION OF SINGLE CT OF 3/2 CONNECTION

This application claims the benefit of China Provisional Patent Application Serial No. 201510890068.6, filed Dec. 7, 2015, which is hereby incorporated by reference in its entirety.

TECHNICAL FIELD

The present disclosure belongs to the technical field of power system relay protection, and in particular to a method for preventing a maloperation of differential protection of an optical fiber caused by saturation of a single Current Transformer (CT) of a 3/2 connection mode.

BACKGROUND

A relay protection device is an important component of a power system, and plays a very important role in guaranteeing safety operation of the system. It removes faulty equipment when the system is faulty, and contributes to safety operation of the system. However, inaccurate actions about relay protection cause a huge damage on the system.

Current differential protection is widely applied, by virtue of a simple and reliable principle thereof, to protection of a high voltage transmission line, a bus and master electrical equipment. A fundamental operating principle of current differential protection refers to: comprehensively judging, based on a Kirchhoffs current law, whether an internal fault occurs according to a current of each of sections of protected equipment. Thus, the transformation precision of a CT will become a key of influencing precision of the differential protection. As the capacity of the power system increases, when the system is faulty, a fault current is very high, thereby making it possible to cause a phenomenon of CT saturation.

Two sides of a transmission line based on a double-bus connection mode are provided with only one CT, and when the line is externally faulty, currents at two sides can form a differential and brake current to identify whether an internal fault occurs. At present, two switch CTs are mounted at a 3/2 connection side of a transmission line based on a 3/2 connection mode, and a line protection device is connected to a sum current of currents of two switches in engineering. Under an extreme situation, when a fault of a bus occurs during a period for charging a single-side of the line, a fault current flows to a faulty bus from a fault-free bus, i.e., a current passes through the line which is supposed to be current-free in normal situation. However, when one of the switch CTs is saturated, the line will sense the fault current, which may cause a maloperation of differential protection. At present, there is not a method capable of solving the problem of a maloperation of differential protection of a transmission line caused by saturation of a switch CT in a 3/2 connection mode in the art.

SUMMARY

The present disclosure aims to provide a method for preventing a maloperation of differential protection of an optical fiber caused by saturation of a single CT of a 3/2 connection mode, and is intended to provide a method capable of solving the problem of a maloperation of differential protection of a transmission line caused by saturation of a switch CT in a 3/2 connection mode.

To this end, the solutions of the present disclosure are as follows.

A method for preventing a maloperation of differential protection of an optical fiber caused by saturation of a single CT of 3/2 connection includes the following steps:

(1) connecting currents of two switches at a 3/2 connection side to a line protection device respectively, and collecting a sample value of the current 1 of a side of a line where the two switches are arranged, a sample value of the current 2 of the side of the line where the two switches are arranged, and a sample value of a current of a side of the line opposite to the side where the two switches are arranged;

(2) if three or more successive sampling points satisfy a start condition respectively, judging that a fault occurs;

(3) if the three or more successive sampling points do not satisfy a differential judgment element and a phase current judgment element respectively after the fault occurs, judging that the fault is an external fault, otherwise, judging that the fault is an internal fault; when it is judged that the fault is the internal fault, opening the differential protection, and when it is judged that the fault is the external fault, locking the differential protection.

The formula of the start condition in Step (2) is: $|iqd_k|>1.25|iqd_{k-2N}|+0.4In$, where $iqd_k=|im1_k-im1_{k-2N}|+|im2_k-im2_{k-2N}|+|in_k-in_{k-2N}|$, im1, im2 and in are a sample value of the current 1 of the side of the line where the two switches are arranged, a sample value of the current 2 of the side of the line where the two switches are arranged and a sample value of a current of the side of the line opposite to the side where the two switches are arranged, N is a number of samples per cycle, and In is a rated value of the current of the CT.

The formula of the differential judgment element in Step (3) is:

$$\begin{cases} |iop_k| > 0.5|ires_k| \\ |iop_k| > 0.3In \\ |iop_k - iop_{k-2N}| > 0.2In \end{cases},$$

where $iop_k=|im1_k+im2_k+in_k|$, $ires_k=|im1_k|+|im2_k|+|in_k|$, im1, im2 and in are a sample value of the current 1 of the side of the line where the two switches are arranged, a sample value of the current 2 of the side of the line where the two switches are arranged and a sample value of a current of the side of the line opposite to the side where the two switches are arranged, N is a number of samples per cycle, and in is a rated value of the current of the CT.

The formula of the phase current judgment element in Step (2) is:

$$\begin{cases} |im1_k + im2_k| > 0.5|im1_k - im2_k| \\ |im1_k| > 0.5In \\ |im2_k| > 0.5In \\ |iop_k| > 0.3In \end{cases},$$

where im1, im2 and in are a sample value of the current 1 of the side of the line where the two switches are arranged, a sample value of the current 2 of the side of the line where the two switches are arranged and a sample value of a current of the side of the line opposite to the side where the two switches are arranged, N is a number of samples per cycle, and In is a rated value of the current of the CT.

In Step (2), when the fault occurs, a first sampling point among the three or more successive sampling points is a first start point; in Step (3), the three or more successive sampling points involved in the differential judgment element and the phase current judgment element start from the first start point.

Flags of the internal and external faults judged in Step (3) are kept for 120 ms from the time when the start condition is satisfied, and re-judgment is not carried out for 120 ms.

Embodiments of the present can have advantages such as reliable identification of internal and external faults, and preventing internal faults being misjudged as external faults.

Further, features of internal and external faults identified at an initial stage of a fault are kept for a certain time for protection logics at middle and later stages of the faults, and a maloperation of differential protection caused by CT saturation before external faults are removed can be effectively prevented.

DETAILED DESCRIPTION

Figure 1:
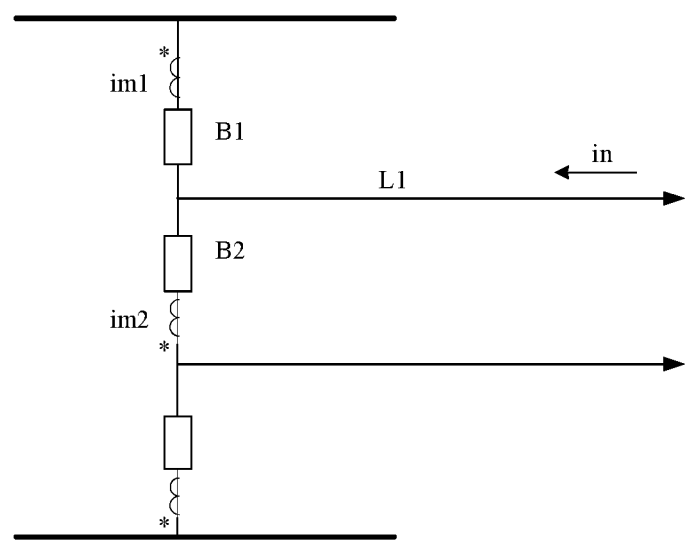
FIG. 1 is a schematic diagram of an external fault of a transmission line in a 3/2 connection mode.
Figure 2:
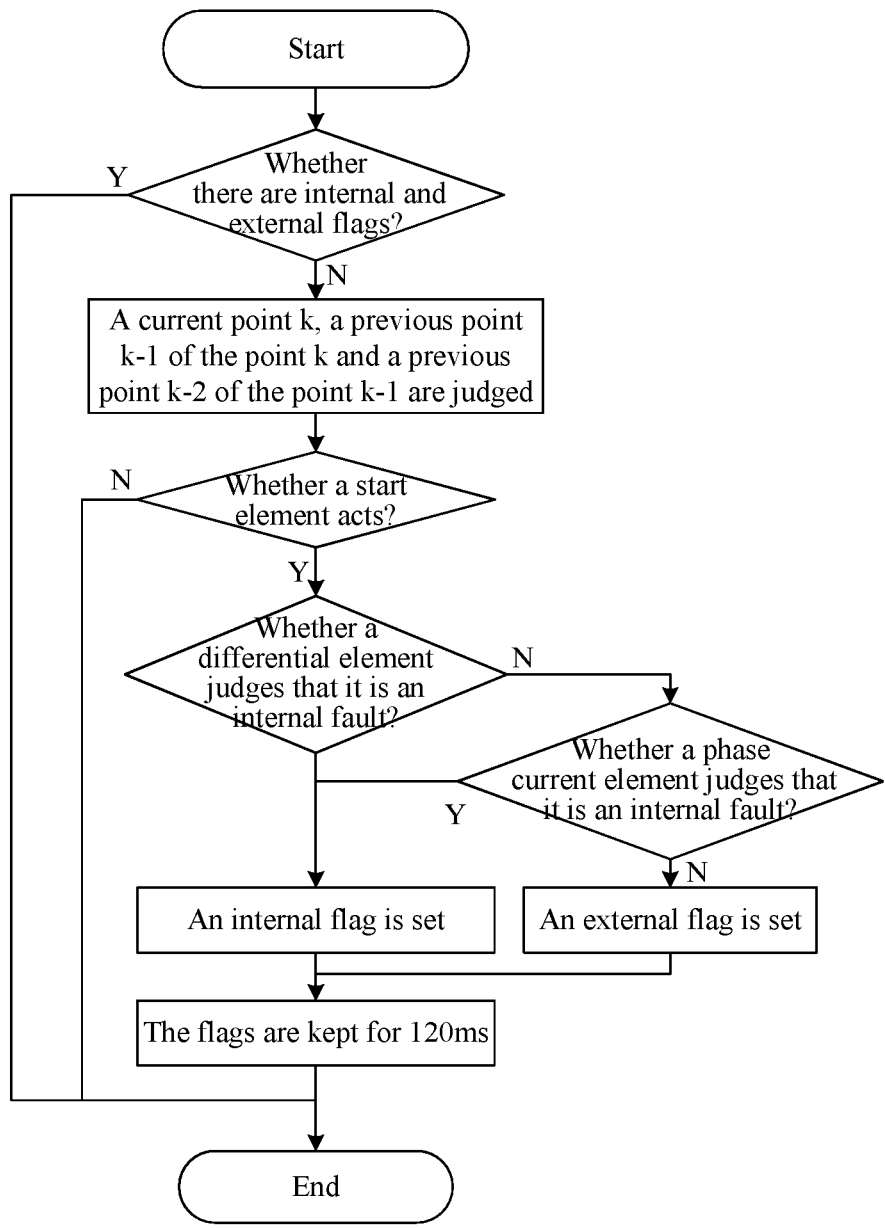
FIG. 2 is a flow chart showing operations according to an embodiment of the present disclosure.
Figure 3:
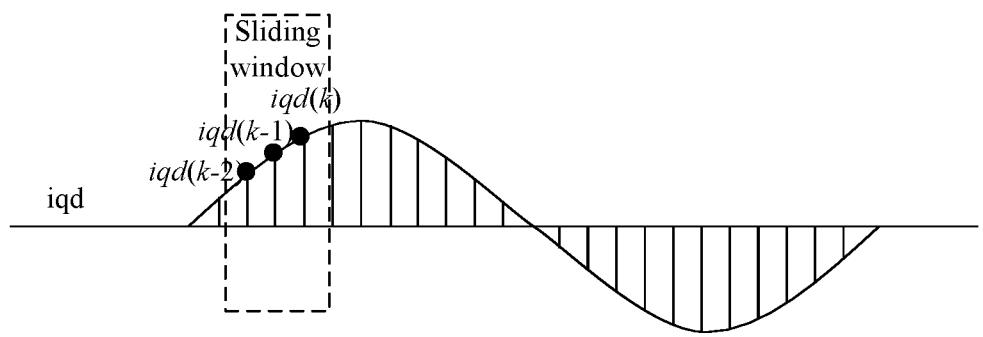
FIG. 3 is a chart showing a method for taking sample points according to an embodiment of the present disclosure.

The present disclosure will be further described in detail below in conjunction with the FIGS. 1, 2 and 3.

A method for preventing a maloperation of differential protection of an optical fiber caused by saturation of a single CT of a 3/2 connection mode of the embodiment of the present disclosure is applied to the differential protection of an optical fiber of an extra-high voltage and ultra-high voltage transmission line of level of 330 kV or more based on a 3/2 connection mode. FIG. 1 shows connection of a transmission line in a 3/2 connection mode. FIG. 2 is a flow chart showing operations of an internal-external judgment module. FIG. 3 shows a method for taking sample points by a start element. The method includes the following steps.

(1) Currents of two switches at a 3/2 connection side are connected to a line protection device respectively.

(2) Start currents at a point k, a point k−1 and a point k−2 are calculated according to the currents of a side of a line L1 where the two switches are arranged and a current of a side of the line L1 opposite to the side where the two switches are arranged.

(3) It is judged whether the start currents at the point k, the point k−1 and the point k−2 satisfy a start formula. If the start currents do not satisfy the start formula, subsequent steps are performed, and otherwise, the process directly returning to the previous steps. The start formula is:

$$|iqd_k| > 1.25|iqd_{k-2N}| + 0.4In \qquad (1),$$

where $iqd_k = |im1_k - im1_{k-2N}| + |im2_k - im2_{k-2N}| + |in_k - in_{k-2N}|$, im1, im2 and in are a sample value of the current 1 of the side of the line L1 where the two switches are arranged, a sample value of the current 2 of the side of the line L1 where the two switches are arranged and a sample value of a current of a side of the line L1 opposite to the side where the two switches are arranged, N is a number of samples per cycle, and In is a rated value of the current of the CT;

(4) It is judged whether at least two of the point k, the point k−1 and the point k−2 satisfy a differential judgment formula. If the at least two satisfy the differential judgment formula, a flag of an internal fault is output. The differential judgment formula is:

$$\begin{cases} |iop_k| > 0.5|ires_k| \\ |iop_k| > 0.3In \\ |iop_k - iop_{k-2N}| > 0.2In \end{cases} \qquad (2)$$

where $iop_k = |im1_k + im2_k + in_k|$, and $ires_k = |im1_k| + |im2_k| + |in_k|$.

(5) This step is performed when it is judged it is not an internal fault in Step (4), otherwise, directly this step is skipped. It is judged whether at least two of the point k, the point k−1 and the point k−2 satisfy a phase current judgment formula. If the at least two satisfy the phase current judgment formula, a flag of an internal fault is output. The phase current judgment formula is:

$$\begin{cases} |im1_k + im2_k| > 0.5|im1_k - im2_k| \\ |im1_k| > 0.5In \\ |im2_k| > 0.5In \\ |iop_k| > 0.3In \end{cases} \qquad (3)$$

In the case, in order to ensure the accuracy of internal-external judgment, it is necessary to ensure judgment on all sampling points during an operation period, and otherwise, linear transformation time before CT saturation is probably missed, which causes impossibility in correct identification of internal and external faults.

Internal-external judgment based on a differential judgment mode may probably misjudge, when an internal fault occurs in an internal line, the internal fault as an external fault due to influence of a transient capacitive current. And in this case, a sub-CT phase current is adopted to correct an error of misjudging the internal fault as the external fault caused by a differential equation.

(6) When it is judged that a fault is not an internal fault according to a differential judgment element and a phase current judgment element in three successively-started points after a start element is started to act, it is judged that the fault is an external fault.

In the present embodiment, an internal-external judgment element is adopted at only first three points started by a start element, flags of judged internal and external faults are kept for 120 ms after starting, and re-judgment is not carried out for 120 ms after starting. Features of internal and external fault identified at an initial stage of a fault broaden a certain time for protection logics at middle and later stages of the fault, and a maloperation of differential protection caused by saturation of CT before the external faults are removed can be effectively prevented.

The present disclosure has the beneficial effects as follows. A current of a side switch B1 and a current of a middle switch B2 in a 3/2 connection mode are introduced to a line protection device simultaneously. Firstly, it is judged whether a fault occurs according to currents of the side of the line L1 where the two switches are arranged and a current of a side of the line L1 opposite to the side where the two switches are arranged; when the fault occurs and the fault is of an initial stage, differential judgment is constructed using the currents of the side of the line L1 where the two switches are arranged and the current of a side of the line L1 opposite to the side where the two switches are arranged and used for identifying internal and external faults; the position of the fault is identified by sub-CT current judgment of a phase relationship between the currents of the side of the line L1 where the two switches are arranged in an auxiliary manner, when it is judged that the fault is an internal fault, the differential protection is opened; when it is judged that the fault is an external fault, the differential protection is locked, so as to prevent a maloperation of differential protection caused during a period of CT saturation. By applying a combination of differential judgment and sub-CT current judgment, reliable identification of internal and external faults is ensured, and the problem that the internal fault is misjudged as the external fault can be prevented as well.

As other implementations, the start element, the differential judgment element, the phase current judgment element and the like can be replaced by other specific formulae in the conventional art.

Under an idea provided in the present disclosure, a technical way in the above embodiment is converted, replaced and modified using a mode easily thought by those skilled in the art; moreover, achieved functions and purposes are basically the same as those of corresponding technical ways in the present disclosure, a technical solution formed thereby is formed by slightly adjusting the above embodiment, and the technical solution still falls within the protective scope of the present disclosure.

What is claimed is:

1. A method for preventing a maloperation of differential protection of an optical fiber caused by saturation of a single Current Transformer (CT) of 3/2 connection, the method comprising:

connecting currents of two switches at a 3/2 connection side to a line protection device respectively, and collecting a sample value of the current 1 between a bus and one of the two switches of a side of a line where the two switches are arranged, a sample value of the current 2 of the side of the line where the two switches are arranged and a sample value of a current of a side of the line opposite to the side where the two switches are arranged during an operation period;

when the samples values of the currents at each of three or more successive sampling points satisfy a start condition respectively, judging that a fault occurs, wherein the formula of the start condition is:
$|iqd_k| > 1.25|iqd_{k-2N}| + 0.4 In$,
where $iqd_k = |im1_k - im1_{k-2N}| + |im2_k - im2_{k-2N}| + |In_k - In_{k-2N}|$, im1, im2 and in are the sample value of the current 1 between the bus and one of the two switches of the side of the line where the two switches are arranged, the sample value of the current 2 of the side of the line where the two switches are arranged and the sample value of a current of the side of the line opposite to the side where the two switches are arranged, N is a number of samples per cycle, and In is a rated value of the current of the CT;

when the samples values of the currents at each of the three or more successive sampling points do not satisfy a differential judgment element and a phase current judgment element respectively after the fault occurs, judging that the fault is an external fault, otherwise, judging that the fault is an internal fault; when it is judged that the fault is the internal fault, opening the differential protection, and when it is judged that the fault is the external fault, locking the differential protection.

2. The method of claim 1, wherein the formula of the differential judgment element is:

$$\begin{cases} |iop_k| > 0.5|ires_k| \\ |iop_k| > 0.3 In \\ |iop_k - iop_{k-2N}| > 0.2 In \end{cases},$$

where $iop_k = im1_k + im2_k + in_k|$, $ires_k = |im1_k| + |im2_k| + |in_k|$, im1, im2 and in are the sample value of the current 1 between the bus and one of the two switches of the side of the line where the two switches are arranged, the sample value of the current 2 of the side of the line where the two switches are arranged and a sample value of a current of the side of the line opposite to the side where the two switches are arranged, N is a number of samples per cycle, and In is a rated value of the current of the CT.

3. The method of claim 1, wherein the formula of the phase current judgment element is:

$$\begin{cases} |im1_k + im2_k| > 0.5|im1_k - im2_k| \\ |im1_k| > 0.5 In \\ |im2_k| > 0.5 In \\ |iop_k| > 0.3 In \end{cases},$$

where im1, im2 and in are the sample value of the current 1 between the bus and one of the two switches of the side of the line where the two switches are arranged, the sample value of the current 2 of the side of the line where the two switches are arranged and the sample value of a current of the side of the line opposite to the side where the two switches are arranged, N is a number of samples per cycle, and In is a rated value of the current of the CT.

4. The method of claim 1, wherein when it is judged that the fault occurs, a first sampling point among the three or more successive sampling points is a first start point; and wherein the three or more successive sampling points involved in the differential judgment element and the phase current judgment element start from the first start point.

5. The method of claim 1, wherein flags of the internal and external faults judged are kept for 120 ms from the time when the start condition is satisfied, and re judgment is not carried out for 120 ms.

* * * * *